March 6, 1945. O. W. LIVINGSTON 2,371,056
ELECTRIC VALVE CONTROL SYSTEM
Filed Oct. 5, 1942
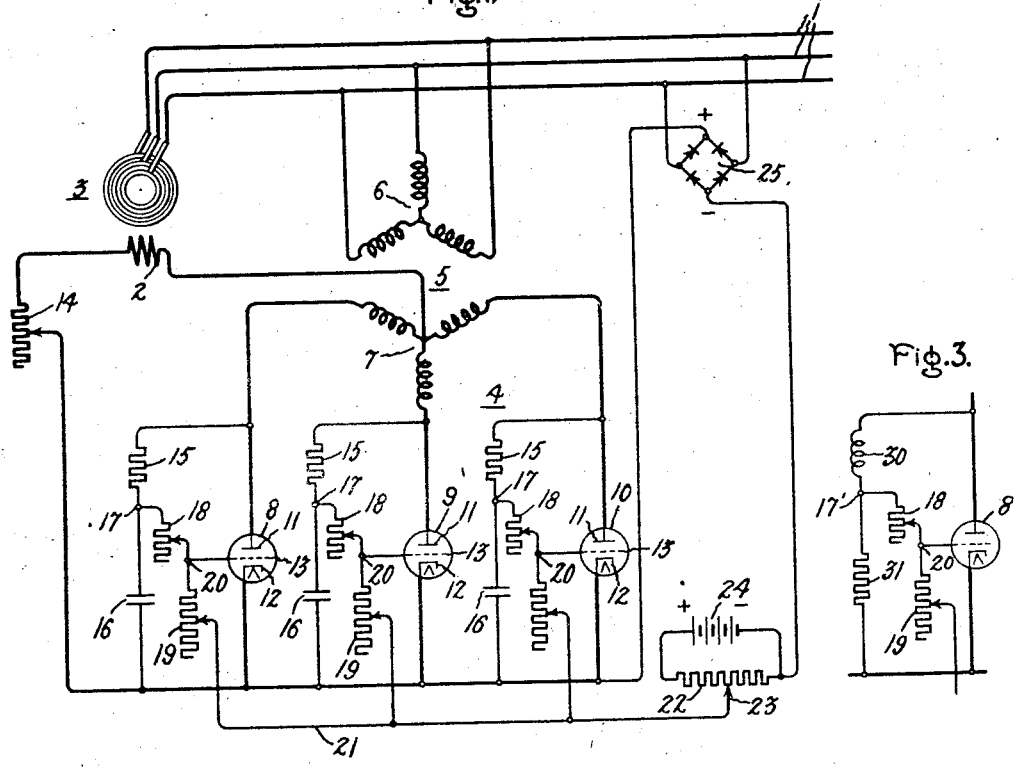
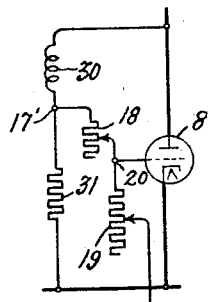
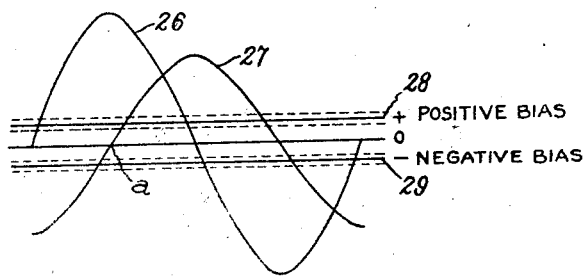
Inventor:
Orrin W. Livingston,
by Harry E. Dunham
His Attorney.

Patented Mar. 6, 1945

2,371,056

UNITED STATES PATENT OFFICE 2,371,056

ELECTRIC VALVE CONTROL SYSTEM

Orrin W. Livingston, Scotia, N. Y., assignor to General Electric Company, a corporation of New York Application October 5, 1942, Serial No. 460,889

12 Claims. (Cl. 315—146)

My invention relates to electric valve control systems and more particularly to control circuits for electric valves of the type having an ionizable medium.

Heretofore, in the control of electric valves of the type employing ionizable mediums, such as gases or vapors, various means have been proposed or used whereby the control electrode or grid is energized to permit conduction of the valve at selectively variable instants of time throughout the positive half cycle of the anode voltage of such valves to control the amount of power transmitted between interconnected circuits. One such method of control comprises impressing an alternating voltage on the control electrode which is adjusted to a substantially fixed retarded phase position with respect to the voltage of its associated anode and also introducing into the control electrode circuit a unidirectional voltage which is made variable in accordance with a condition to be controlled or regulated in such a manner as to vary the instants of conduction or points of "firing" of the electric valve. Such methods of control have heretofore required transformers in the excitation circuits, or so-called grid transformers, to provide the component of alternating voltage in the control electrode circuit. The use of grid transformers is undesirable in some applications, particularly in multiphase circuits, and it is desirable to eliminate such transformers. Furthermore, the conventional grid control systems of the above type require correct phasing of the grid transformers for each valve of a multiphase system, which is a complication to be avoided.

It is, therefore, an object of my invention to provide a new and improved electric valve control system which is simple, reliable and economical and which avoids disadvantages of prior art arrangements.

It is another object of my invention to provide a new and improved electric valve control system which obviates the use of transformers in the grid or control electrode circuit of electric valves utilizing an alternating component of voltage in the control circuit.

It is a further object of my invention to provide a new and improved electric valve control system which may take the form of unit construction per phase in multiphase circuits, thereby simplifying adjustments, repairs and maintenance of electric valve control circuits in multiphase systems.

In accordance with the illustrated embodiments of my invention, I impress on the electric valve control circuit an alternating component of voltage and a unidirectional component of voltage derived simultaneously from a resistance-reactance circuit connected to be energized in accordance with the voltage across the anode-cathode circuit of the electric valve to be controlled and introduce in circuit with the two components of voltage a third component of unidirectional voltage which is variable in accordance with the condition to be controlled or regulated.

My invention will be better understood from the following description taken in connection with the accompanying drawing, and its scope will be pointed out in the appended claims.

In the drawing, Fig. 1 is a diagrammatic representation of one embodiment of my invention; Fig. 2 is a diagram for explaining the general principles of operation of the illustrated embodiments of my invention, and Fig. 3 illustrates a modification of the valve control circuit of Fig. 1.

Referring to Fig. 1 of the drawing, I have illustrated my invention in connection with an electric valve rectifier system for supplying direct current from an alternating current supply circuit 1 to a direct current load circuit 2. For purposes of illustration, I have shown the circuit 1 as representing a three-phase alternating current circuit connected to a synchronous machine 3. The load circuit 2 is representative of the synchronous machine field winding supplied with direct current from the alternating current circuit 1 through a controlled electric valve rectifier system 4. The electric valve rectifier system 4 comprises a transformer 5 having a primary winding 6 and for purposes of illustration a simple three-phase Y connected secondary winding 7. Electric valves 8, 9 and 10 are connected to the respective phase terminals of the secondary winding 7. These electric valves are preferably of the type employing an ionizable medium, such as gas or vapor, and are each provided with an anode 11, a cathode 12 and a control electrode or grid 13. For simplicity of terms, the expression "grid" or "grid circuit" will be used herein in a generic sense to include a grid structure, an immersion igniter, or any other suitable form of control electrode. The cathodes 12 are all connected to a common bus which is connected to one side of the field winding 2, while the other side of field winding 2 is connected to the neutral point of secondary winding 7. An adjustable resistance 14 may be connected in this field circuit. The same numerals will be used for corresponding elements of the valves and also for corresponding elements of the grid circuits since one of the features of my invention is to obtain a unit construction and each grid circuit may be made up as a unit and interchangeably connected to any one of the electric valves. Each grid circuit comprises a resistance 15 and a capacitance 16 connected in series relation across the anode 11 and cathode 12 of its associated valve. The grid circuit also includes two series connected resistances 18 and 19 which are each made variable and connected between the junction point 17 of resistance 15 and the capacitance 16 and the common cathode connection. The grid 13 is connected to the junction point 20 between resistances 18 and 19. In the circuit from the common connection bus 21 of the resistances 19 and the cathode of the valves, I connect a source of adjustable or variable voltage which is illustrated by the voltage divider 22 provided with an adjustable tap 23 and supplied with a constant unidirectional voltage as by a valve rectifier and suitable filter or, as illustrated, by a battery 24. The component of voltage derived from the voltage divider is arranged to have such a polarity in the grid circuit as to function as a controllable bias which may operate from positive to negative. By shifting the adjustable connection 23 of voltage divider 22, this component of voltage may be adjusted or varied in any suitable manner, either manually or automatically, to adjust or vary the period of conduction of the valves. The controllable bias impressed on the grid circuit may also be varied by keeping the adjustable connection fixed and using a fixed component of positive bias in differential relation with a negative bias arranged to vary in accordance with any variable condition it is desired to control or regulate. As an illustration of this type of automatic control, I have shown a full wave rectifier 25 connected to the alternating current circuit 1 and having its output circuit connected in series relation with the voltage component derived from the voltage divider so that the net controllable bias will be varied in magnitude and polarity in accordance with the output of rectifier 25 which can be made to vary, for example, in accordance with the voltage of circuit 1 or any other desired operating condition of a machine or circuit.

Since the grid control circuits of all the valves are similar, the operation of these circuits may be understood by examining the voltage conditions existent in the grid control of valve 8. For simplicity of explanation, it will be assumed that the voltage divider 22 is connected directly to the cathode bus so as to exclude rectifier 25. The grid voltage may be thought of as being made up of two principal components; the direct current potential supplied from the voltage divider 22 through resistance 19 and the voltage across the capacitance 16 supplied in parallel with the first mentioned circuit through its associated series resistance 18. The voltage across capacitance 16 may in turn be analyzed as comprising two voltages in series; a negative direct current component due to the direct current component across the anode-cathode of valve 8 when functioning as a rectifier, and an alternating voltage component due to the anode to neutral transformer voltage impressed across the network comprising resistance 15 and capacitance 16. When valve 8 is functioning as an inverter it will be obvious that the bias derived from 15—16 will be reversed in polarity and will then be a positive bias. The ohmic values of resistance 15 and capacitance 16 are chosen so that the resistance predominates and the in-phase current resulting causes the voltage across capacitance 16 to be lagging a substantial amount with respect to the anode potential of valve 8. This phase shift has been found to be satisfactory when it is of the order of 90 degrees for electric valves feeding into an inductive load circuit. It will be seen, therefore, that for rectifier operation of valve 8 there is impressed on the grid circuit thereof a combination of a substantially fixed 90 degree lagging alternating voltage, a negative direct current voltage proportional to the output voltage of the valve and a variable direct current voltage obtained from the voltage divider 22. Thus, as the direct current control voltage from voltage divider 22 is made more positive, the phase of the grid excitation is advanced so that the valve is rendered conductive at an early point in the positive cycle of its anode voltage and the output voltage is consequently increased. Decreasing the control voltage from voltage divider 22 will retard the phase of the grid excitation and decrease the output voltage of valve 8.

It will be noted that as the direct current output voltage of the valve 8 increases, the direct current component of voltage derived from across capacitance 16 also increases, tending to counteract the increasing voltage from the voltage divider 22. This requires somewhat more voltage "swing" from the voltage divider 22 but gives a very desirable stability to the control circuit. The amount of direct current "swing" required for full control is, of course, determined by the relative magnitudes of resistances 18 and 19. As resistance 18 is made smaller and resistance 19 larger, more voltage "swing" is required to control the valve 8 and as resistance 18 is made larger and 19 smaller, less voltage swing is required.

The general operation of the grid control circuit may be readily understood by an examination of Fig. 2. The curve 26 represents the voltage applied to the anode-cathode circuit of valve 8 from transformer 7 for rectifier operation. It will be assumed that the horizontal axis (marked zero) of this curve also represents the firing line of the valve during the positive half cycle. The curve 27 represents the alternating component of voltage applied to the grid and it will be observed that this voltage is retarded substantially 90 degrees with respect to the anode voltage. If no other potential were introduced into the grid circuit the valve 8 would be rendered conductive at the point $a$. However, the second horizontal line 28 above the zero axis (as viewed in the drawing) represents a positive bias voltage derived from the voltage divider 22. This positive bias voltage in effect advances the point of firing toward the zero phase position of curve 26 and causes the valve 8 to be rendered conductive at an earlier point in the positive half cycle of anode voltage. However, there is an additional negative bias under the assumed rectifier operation introduced into the grid circuit from the network 15—16 which is represented by the horizontal line 29 below the zero axis.

Although the network for deriving the alternating component and the direct current bias, preferably comprises the resistance 15 and capacitance 16, for reasons of economy and excellence of operation it is possible to obtain the two components of voltage by the modification of my invention shown in Fig. 3. In this case, I replace the resistance 15 with an inductance 30 and the capacitance with a resistance 31. The resistances 18 and 19 are otherwise the same and connected to the junction point 17' between the inductance 30 and resistance 31. Here the inductance would have a reactance of a relatively high ohmic value compared to the resistance 31 so that the voltage across resistance 31 would be in phase with the lagging current of the inductance and thereby provide a voltage which lags the anode voltage substantially 90 degrees.

The above-described operation has been made on the assumption that the adjustable connection 23 of voltage divider 22 is moved manually or automatically to vary the direct current control potential. However, it will be obvious that if the potential from voltage divider 22 is fixed and differentially related to a variable potential from rectifier 25, the resultant control potential both in magnitude and polarity will be varied in accordance with the variation of the voltage of circuit 1. For example, if machine 3 is a synchronous generator and its voltage rises above a predetermined value determined by the setting of voltage divider 22 the direct current positive component of voltage will be decreased and cause the phase of the grid circuit to be retarded, thereby decreasing the excitation and decreasing the termingal voltage to normal. Similarly, a drop in generator terminal voltage will cause a drop in the output voltage of rectifier 25 and cause a net increase in the positive direct current voltage of the grid circuit to increase the field excitation and increase the generator terminal voltage to the normal value.

For synchronous motor or synchronous condenser operation, it will be apparent that the rectifier 25, or analogous device, may be made responsive to the variable conditions to be controlled, such as power, current, power factor, etc., and thereby control the controllable bias to effect the desired variation of field excitation. It will be observed that the illustrated arrangement may be used to increase the excitation of the machine 3 as a synchronous motor if the supply voltage falls below a predetermined value so that the pull-out torque will be increased whenever the supply voltage decreases from normal. As a synchronous condenser, the machine 3 and control as illustrated may be utilized to hold voltage on the circuit 1 since a drop in voltage of circuit 1 causes an increase in excitation of machine 3 and causes machine 3 to furnish more leading reactive kva. to the system and return the voltage of circuit 1 to normal.

While I have shown and described several embodiments of my invention, it will be obvious to those skilled in the art that various changes and modifications may be made without departing from my invention, and I, therefore, aim in the appended claims to cover all such changes and modifications as fall within the true spirit and scope of my invention.

What I claim as new and desire to secure by Letters Patent of the United States is:

1. In combination, an alternating current circuit, an electric valve connected therein and provided with an anode, a cathode, and a control electrode, means comprising a resistance and a reactance network connected to be responsive to the anode-cathode voltage of said valve for simultaneously applying across said control electrode and said cathode both an alternating component of voltage dephased relative to the anode-cathode voltage of said valve and a unidirectional component of voltage, and means including a source of unidirectional voltage connected across said control electrode and said cathode for applying to said control electrode a component of unidirectional voltage in parallel relation with the alternating and unidirectional components of voltage derived from said network.

2. In combination, an alternating current circuit, an electric valve connected in said circuit and having an anode, a cathode and a control electrode, means responsive to the anode-cathode voltage of said valve for deriving therefrom and impressing on said control electrode an alternating voltage of a substantially constant retarded phase with respect to said anode potential and a direct current voltage of a polarity tending to maintain said valve nonconductive, and means comprising a source of variable unidirectional voltage connected to said control electrode and cooperating with said direct current voltage and said alternating component of voltage for shifting the instants of ignition of said valve.

3. In combination, an alternating current circuit, an electric valve connected therein having an anode, a cathode and a control electrode, means comprising a series connected resistance and reactance network connected across the anode and cathode of said valve, a second resistance connected at the junction of said first mentioned resistance and reactance of said network and to said control electrode for deriving from said network and applying to said control electrode both an alternating component of voltage dephased relative to the anode-cathode voltage of said valve and a unidirectional component of voltage, a source of direct voltage, and means comprising a third resistance connected at the junction of said second resistance and said control electrode for applying to said control electrode in parallel relation with the components of voltage from said network a direct component of voltage variable in magnitude and polarity relative to the direct component of voltage derived from said network.

4. In combination, an electric valve having an anode, a cathode, and a control electrode, a circuit comprising a series connected resistance and reactance connected across the anode and cathode of said valve, the ohmic value of said resistance being of a value relative to the ohmic value of said reactance as to provide upon alternating voltage energization of said anode-cathode circuit an alternating component of voltage in said resistance-reactance circuit lagging the alternating voltage of said anode of the order of 90 degrees, means for connecting said control electrode to the juncture between said first-mentioned resistance and reactance, a second resistance connected between said control electrode and the cathode of said valve, and means including a source of direct current voltage connected in circuit with said second resistance for varying the direct current potential impressed upon said control electrode.

5. In combination, an electric valve having an anode, a cathode and a control electrode, a series connected resistance and inductance connected across the anode and cathode of said valve, said inducance having a substantially higher ohmic reactance than the ohmic value of said resistance, means including a resistance for connecting said control electrode to the juncture between said first-mentioned resistance and inductance, a third resistance connected between said control electrode and the cathode of said valve, and means including a source of variable direct current voltage connected in series relation with said third resistance.

6. In combination, an electric valve having an anode, a cathode, and a control electrode, a series-connected resistance and capacitance connected across the anode and cathode of said valve, said resistance having a substantially higher ohmic value than the ohmic reactance of said capacitance, means including a resistance for connecting said control electrode to the juncture between said first-mentioned resistance and capacitance, a third resistance connected between said control electrode and the cathode of said valve, and means including a source of variable direct current voltage connected in series relation with said third resistance.

7. In combination, an electric valve having an anode, a cathode, and a control electrode, a series-connected resistance and capacitance connected across the anode and cathode of said valve with one terminal of said capacitance connected to said cathode, said resistance having such an ohmic value relative to the ohmic reactance of said capacitance as to provide upon alternating voltage energization of said anode-cathode an alternating component of voltage across said capacitance which lags the alternating voltage of said anode substantially 90 degrees, means including an adjustable resistance connected between said control electrode and the juncture of said first-mentioned resistance and capacitance, a second adjustable resistance connected between said control electrode and said cathode, and means for producing a direct current voltage connected in circuit with said second adjustable resistance for varying the direct current potential impressed upon said control electrode.

8. In combination, an alternating current circuit, a direct current circuit, means including a vapor electric device provided with an anode and a cathode connected between said circuits and with a control electrode arranged to control the current transmitted between said anode and cathode, means comprising a resistance and a reactance connected to be energized in accordance with the anode-cathode voltage of said device for deriving simultaneously therefrom an alternating component of voltage and a unidirectional component of voltage, means for impressing said components of voltage on the control electrode of said device, and means connected in the control electrode-cathode circuit of said device for introducing therein a second unidirectional component of voltage variable in magnitude and polarity relative to said first mentioned unidirectional component of voltage.

9. In combination, an alternating current circuit, a second circuit, a vapor electric device provided with an anode and a cathode connected between said circuits and with a control electrode circuit arranged to control the current transmitted between said anode and cathode, means comprising an impedance network connected to be responsive to the anode-cathode voltage of said device for producing in said control electrode circuit both a unidirectional component of voltage and an alternating component of voltage retarded in phase relative to the anode-cathode voltage, a second source of unidirectional voltage connected in said control electrode circuit, and means for varying the magnitude of said second unidirectional voltage to vary the current interchanged between said alternating current circuit and said second circuit.

10. In combination, an alternating current circuit, an electric valve connected in said circuit and having an anode, a cathode and a control electrode, means comprising an impedance network connected to be responsive to the anode-cathode voltage of said valve for deriving therefrom and for impressing on said control electrode an alternating voltage of a substantially constant retarded phase relative to the voltage of said anode and a direct current bias voltage, means comprising a source of unidirectional control voltage connected to energize said control electrode, means for producing a source of variable voltage, and means responsive to said variable voltage and connected in circuit with said control electrode for varying the control voltage of said control electrode.

11. In combination, an alternating current circuit, a second circuit, a vapor electric device provided with an anode and a cathode connected between said circuits and with a control electrode circuit arranged to control the current transmitted between said anode and cathode, means comprising a resistance and a capacitance connected to be responsive to the anode-cathode voltage of said device, means for connecting said capacitance in the control electrode-cathode circuit of said device, means including a source of unidirectional bias voltage connected in the control electrode-cathode circuit of said device, and means responsive to an operating condition of one of said circuits for varying the unidirectional potential of said control electrode.

12. In combination, a polyphase alternating current circuit, a second circuit, a plurality of vapor electric devices arranged one with each phase of said polyphase circuit and each having an anode and a cathode connected between its associated circuits, each of said vapor electric devices being provided with a control electrode arranged to control the current transmitted between its associated anode and cathode, a plurality of impedance networks arranged one with each of said vapor electric devices and each comprising a resistance and a reactance connected in series relation across the anode and cathode of its associated device, a plurality of resistance networks connected one with each of said impedance networks and the control electrode of its associated electric device for producing in its associated control electrode circuit a unidirectional bias voltage and a component of alternating voltage dephased relative to its associated anode voltage, a second source of unidirectional voltage connected in and common to the respective control electrode circuits of said electric devices, and means for varying the unidirectional potential of the respective control electrode circuits.

ORRIN W. LIVINGSTON.